J. H. SMITH.
OPTICAL SCREEN FOR PHOTOGRAPHIC AND PRINTING PURPOSES.
APPLICATION FILED MAR. 22, 1906.

914,197.  Patented Mar. 2, 1909.

WITNESSES:
George G. Schoenlank
O. H. Berrigan

INVENTOR,
JOHN HENRY SMITH,
by H. van Oldenul
ATTORNEY.

UNITED STATES PATENT OFFICE.

JOHN HENRY SMITH, OF ZURICH, SWITZERLAND.

OPTICAL SCREEN FOR PHOTOGRAPHIC AND PRINTING PURPOSES.

No. 914,197.  Specification of Letters Patent.  Patented March 2, 1909.

Application filed March 22, 1906. Serial No. 307,319.

*To all whom it may concern:*

Be it known that I, JOHN HENRY SMITH, a subject of the King of Great Britain, residing in Zurich, in the Canton of Zurich, Republic of Switzerland, whose post-office address is No. 417 Seestrasse, Zurich, have invented certain new and useful Improvements in Optical Screens for Photographic and Printing Purposes; and I do hereby declare the following to be a full, clear, and exact description of the invention, such as will enable others skilled in the art to which it appertains to make and use the same.

I have applied for patent in Germany on March 23d, 1905, application S. 20901.

The subject of the present invention is a screen consisting of equal-sized equilateral triangular elements arranged as a plane surface to fit each other without intervening spaces or overlapping, and grouped together in definite arrangements of light and dark elements, or, in the case of colored screens, of various colored elements; the original elements being capable of arranging into elements of higher order, and these again into groups of light and dark or colored elements. In this variety in the grouping of the elements lies the possibility of obtaining the most favorable disposition of the contrasting elements.

Under the designation color screen it is to be understood that not only such screens are intended in which all the unit elements are colored in variably contrasting colors but such as contain in addition to the colored elements also colorless or white or black or gray elements or mixtures of such colorless and neutral tinted elements.

In the accompanying drawing a few examples of the screen on an enlarged scale are shown.

Figure 2:
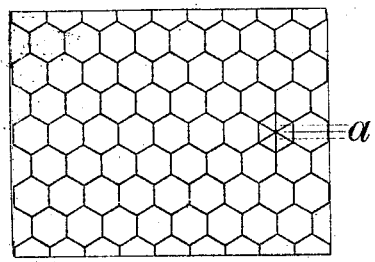
Figure 1:
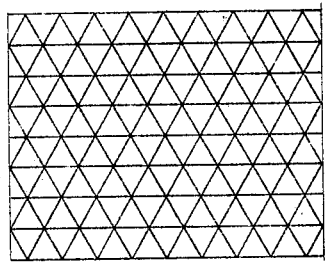
Figure 4:
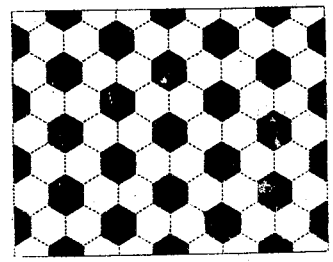
Figure 3:
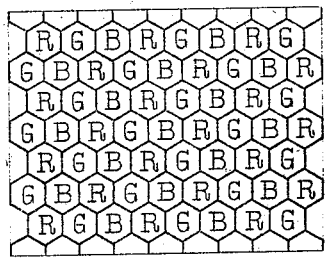

Figure 1 shows a screen area answering to the general description; Fig. 2 shows at (*a*) the grouping of 6 triangular elements to form the screened area; Fig. 3 shows a screen composed of hexagonal elements colored in three contrasting colors; Fig. 4 shows a hexagonal screen in which the similar colors have been imprinted upon a printed surface (shown as black elements), thus yielding one component of the colored screen as shown in Fig. 3.

Referring to Fig. 1, a skeleton screen is shown consisting of equal sized equilateral triangles grouped without intervening spaces or overlapping.

In the example of most importance for the practice shown in Fig. 2 equal-sized equilateral triangular elements (*a*) fitting into each other without intervening spaces or overlapping are grouped together into hexagons. These elements of higher order may be grouped again, and Fig. 3 shows an example of such grouping. The arrangement of the triangles into hexagons, and the circular grouping of these again is of great importance for three color photography, as it enables me to distribute the three primary colors absolutely evenly without linear structure. Fig. 3 shows such a screen, B indicating the blue, G the green, and R the red elements.

The color screens may be upon some transparent base as glass, etc., and serve as taking or viewing screens in the process of color photography; or upon an opaque base as paper to serve for the production of colored prints by the subsequent application of a blank printing similarly screened block.

What I claim is:

1. As a new article of manufacture, a color screen for photographic and printing purposes, having equal-sized, equilateral triangular unit elements grouped together in a definite arrangement without overlapping and without intervening spaces.

2. As a new article of manufacture, a color screen for photographic and printing purposes, having equal-sized equilateral triangular unit elements arranged in hexagonal groups, which are in turn grouped together in a definite arrangement without overlapping and without intervening spaces.

3. As a new article of manufacture, a color screen for photographic and printing purposes, having equal-sized equilateral triangular unit elements arranged in hexagonal groups and which groups are in turn grouped together in a definite arrangement of contrasting color areas without overlapping and without intervening spaces.

4. As a new article of manufacture, a color screen for photographic and printing purposes, having equal-sized equilateral triangular unit elements arranged in hexagonal groups, the hexagonal elements meeting around each central point being colored in three definite contrasting colors, and without overlapping and without intervening spaces.

In testimony whereof, I have signed my name to this specification in the presence of two subscribing witnesses.

JOHN HENRY SMITH.

Witnesses:
 HERMANN HUBER,
 A. LIEBERKNECHT.